United States Patent
Marchlewski et al.

(10) Patent No.: US 10,023,098 B1
(45) Date of Patent: Jul. 17, 2018

(54) CARGO TRANSPORT SYSTEM FOR A TRUCK

(71) Applicant: FORD GLOBAL TECHNOLOGIES, LLC, Dearborn, MI (US)

(72) Inventors: Jack Marchlewski, Saline, MI (US); Joshua Robert Hemphill, White Lake, MI (US); Robert Reiners, Grosse Ile, MI (US); Dragan B. Stojkovic, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/472,884

(22) Filed: Mar. 29, 2017

(51) Int. Cl.
| | |
|---|---|
| *B60P 7/08* | (2006.01) |
| *B60P 7/15* | (2006.01) |
| *B60P 7/10* | (2006.01) |
| *B62D 33/02* | (2006.01) |

(52) U.S. Cl.
CPC ........... *B60P 7/0815* (2013.01); *B60P 7/0807* (2013.01); *B60P 7/10* (2013.01); *B60P 7/15* (2013.01); *B62D 33/02* (2013.01)

(58) Field of Classification Search
CPC ............................ B60P 7/0807; B60P 7/0815
USPC ....... 286/3, 40; 410/127, 129–132; 224/405; 52/708; 403/232.1
See application file for complete search history.

(56) References Cited

U.S. PATENT DOCUMENTS

| | | | |
|---|---|---|---|
| 4,733,898 A | 3/1988 | Williams | |
| 5,118,156 A * | 6/1992 | Richard | B60R 9/00 224/331 |
| 7,419,203 B2 | 9/2008 | Chandler et al. | |
| 2016/0129827 A1 | 5/2016 | Johnston | |

FOREIGN PATENT DOCUMENTS

| | | | | |
|---|---|---|---|---|
| GB | 2163788 | * | 3/1986 | |
| GB | 2316103 A | * | 2/1998 | ........... E04B 1/2612 |

* cited by examiner

*Primary Examiner* — Dennis H Pedder
(74) *Attorney, Agent, or Firm* — Jason Roger; Brooks Kushman P.C.

(57) ABSTRACT

A vehicle includes a truck bed, first docking plate, second docking plate, first bracket, and second bracket. The truck bed has first and second side panels extending upward from a floor panel. The first and second docking plates are secured to opposing internal surfaces of the first and second side panels, respectively. The first and second brackets have upright members secured to the first and second docking plates, respectively, and horizontal members extending from the upright members inward relative to the truck bed.

14 Claims, 4 Drawing Sheets

US 10,023,098 B1

CARGO TRANSPORT SYSTEM FOR A TRUCK

TECHNICAL FIELD

The present disclose relates to pickup trucks and pickup truck cargo beds that are configured to receive and store cargo being transported by pickup trucks.

BACKGROUND

Pickup trucks include cargo beds that are configured to received and store cargo being transported.

SUMMARY

A vehicle includes a truck bed, first docking plate, second docking plate, first bracket, and second bracket. The truck bed has first and second side panels extending upward from a floor panel. The first and second docking plates are secured to opposing internal surfaces of the first and second side panels, respectively. The first and second brackets have upright members secured to the first and second docking plates, respectively, and horizontal members extending from the upright members inward relative to the truck bed.

A truck includes a cargo bed, docking plate, and an L-shaped bracket. The cargo bed has a side panel extending upward from a floor panel. The docking plate is secured to an internal surface of the side panel between a top of the side panel and the floor panel. The L-shaped bracket has a substantially vertical leg secured the docking plate and a substantially horizontal leg extending from the vertical leg inward relative to the cargo bed.

A truck bed cargo transport system includes a bed, plurality of docking plates, and plurality of brackets. The bed has a pair of side panels extending upward from a floor panel. The side panels have opposing internal surfaces. Some of the plurality of docking plates are secured to each opposing internal surface. The plurality of brackets have upright members and horizontal members extending from the upright members. One of the plurality of brackets is secured to each docking plate such that the horizontal members extend away from the docking plates.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
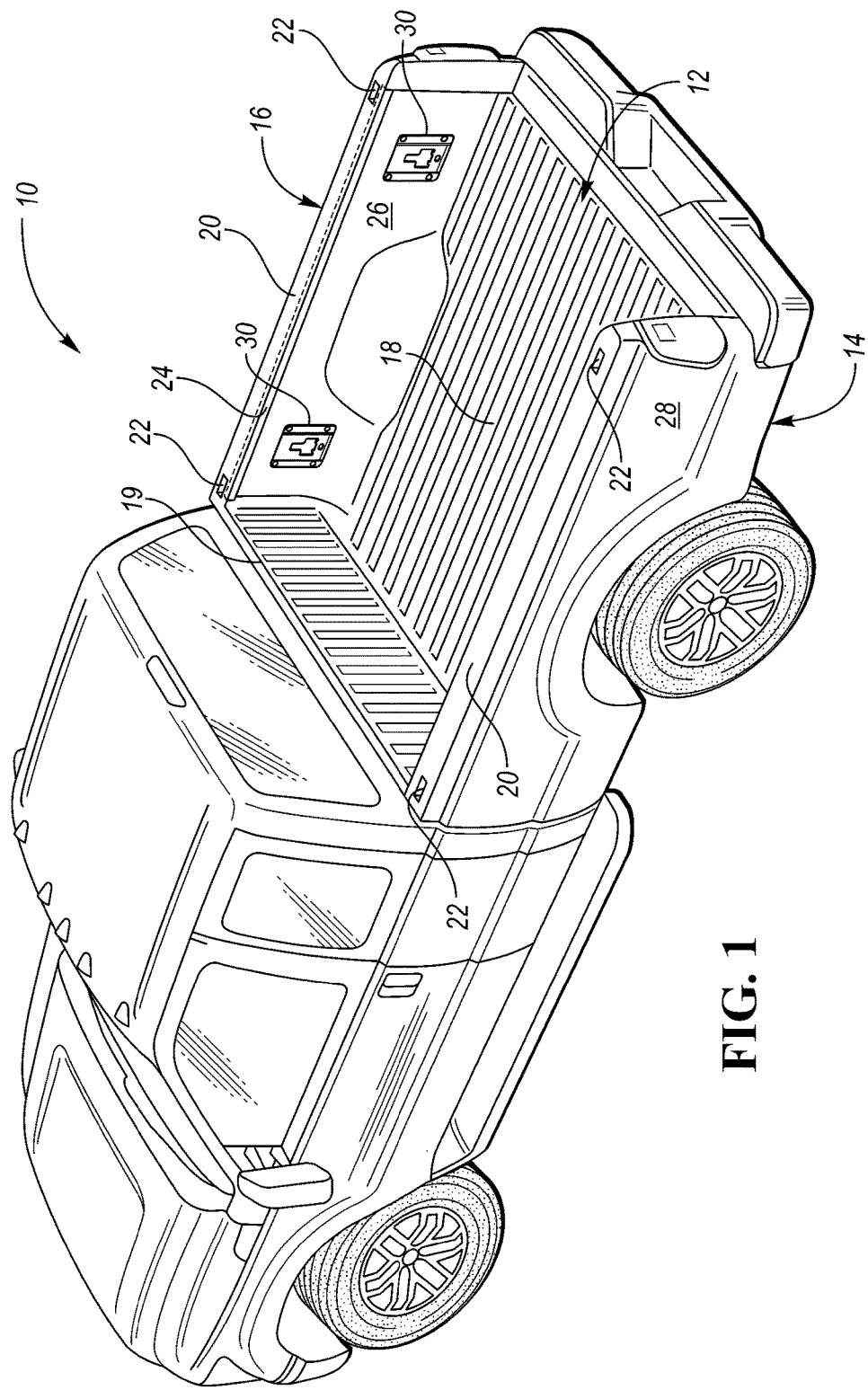
FIG. 1 is a perspective view of a vehicle having a cargo or truck bed.

Referring to FIG. 1, a vehicle 10 is illustrated. The vehicle 10 may be a truck that includes a cargo or truck bed 12. The truck bed 12 may include a first side panel 14 and a second side panel 16. The truck bed 12 may also include a truck bed floor 18 (which may also be referred to as a cargo bed floor or floor panel), a headboard panel 19, and a tailgate (not shown). The first side panel 14 and second side panel 16 may extend upward from the truck bed floor 18. The components of the truck bed 12, including the first side panel 14, second side panel 16, floor 18, headboard panel 19, and tailgate, may be made from a sheet metal material, including but not limited to, steel sheet or an aluminum alloy sheet. The first side panel 14 and second side panel 16 may have top surfaces 20 that define stake pockets 22. The stake pockets 22 are through holes that extend through the top surfaces 20. Portions of the first side panel 14 and second side panel 16 (which may be referred as overhangs 24) may extend away and then downward from the top surfaces 20 of the first and second side panels, towards the truck bed floor 18. The first and second side panels 14, 16 include internal side surfaces 26 that face towards the interior of the truck bed 12 and external side surfaces 28 that face towards the exterior of the truck bed 12. The internal side surfaces 26 of the first side panel 14 and second side panel 16 may be referred to as opposing internal surfaces of the first side panel 14 and second side panel 16.

It may be desirable to secure accessories at different locations within the cargo bed 12. A plurality of fixed plates 30 may be affixed at various location of the truck bed 12 to provide a number of different securing points for various accessories. In at least one embodiment, standard-sized fixed plates 30 are provided at several locations on one or more of the truck bed floor panel 18, first side panel 14, second side panel 16, truck bed floor 18, headboard panel 19, and tailgate. In the depicted embodiment, two standard-sized fixed plates 30 are affixed to the internal side surface 26 of the first side panel 14 between the top surface 20 of the first side panel 14 and the truck bed floor 18. The depicted embodiment also includes two additional standard-sized fixed plates 30 that are affixed to the internal side surface 26 of the second side panel 16 between the top surface 20 of the second side panel 16 and the truck bed floor 18. In alternative embodiments, the fixed plate 30 may be an elongate track having a number of different secure points along its length.

Figure 2:
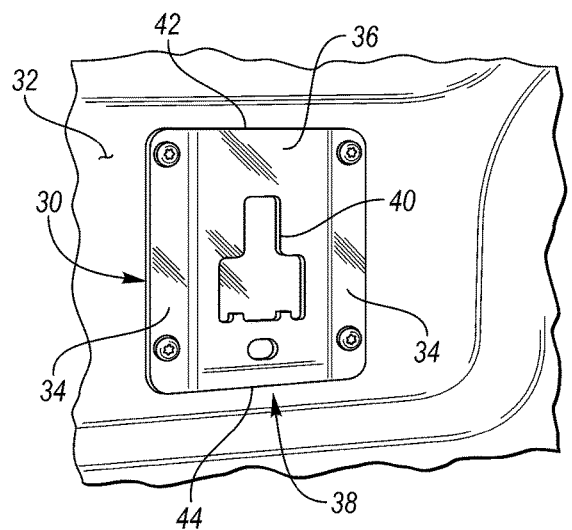
FIG. 2 is a perspective view of a standard interface plate.

Referring to FIG. 2, an example of a standard-sized fixed plate 30 is depicted. The standard-sized fixed plate 30 may alternatively be referred to as a docking plate. As discussed above, each of a number of fixed plates may define standard dimensions to accommodate modular connections using interchangeable components. In the example of FIG. 2, the fixed plate 30 is secured to a vertical wall 32, for example such as the internal side surfaces 26 of the first side panel 14 or second side panel 16. The fixed plate 30 includes a pair of opposing mounting flanges 34 that are secured to the vertical wall 32. An offset section 36 is provided between, and interconnects the opposing mounting flanges 34. The offset section 36 may also be referred to as the protruding middle section. The offset section 36 is positioned at a distance away from the vertical wall 32 to provide a gap 38. More specifically, the gap 38 may be defined by the offset section 36 of the fixed plate 30 spatially between the offset section 36 and the internal side surface 26 of the respective side panel that the fixed plate 30 is attached to, whether it be the first side panel 14 or second side panel 16. In this way, a number of different devices can be mechanically retained to the offset section 36 by extending into the gap 38 and engaging a back surface of the offset section 36. In one example, a hole (or keyway) 40 is provided near a center portion of the offset section. The hole 40 may be shaped to receive a locking feature from an interfacing component to retain to the fixed plate 30. The hole (or keyway) 40 may access the gap 38 defined by the offset section 36. In other examples, an interfacing component may be secured to an upper edge 42 and/or a lower edge 44 of the fixed plate 30.

Figure 3:
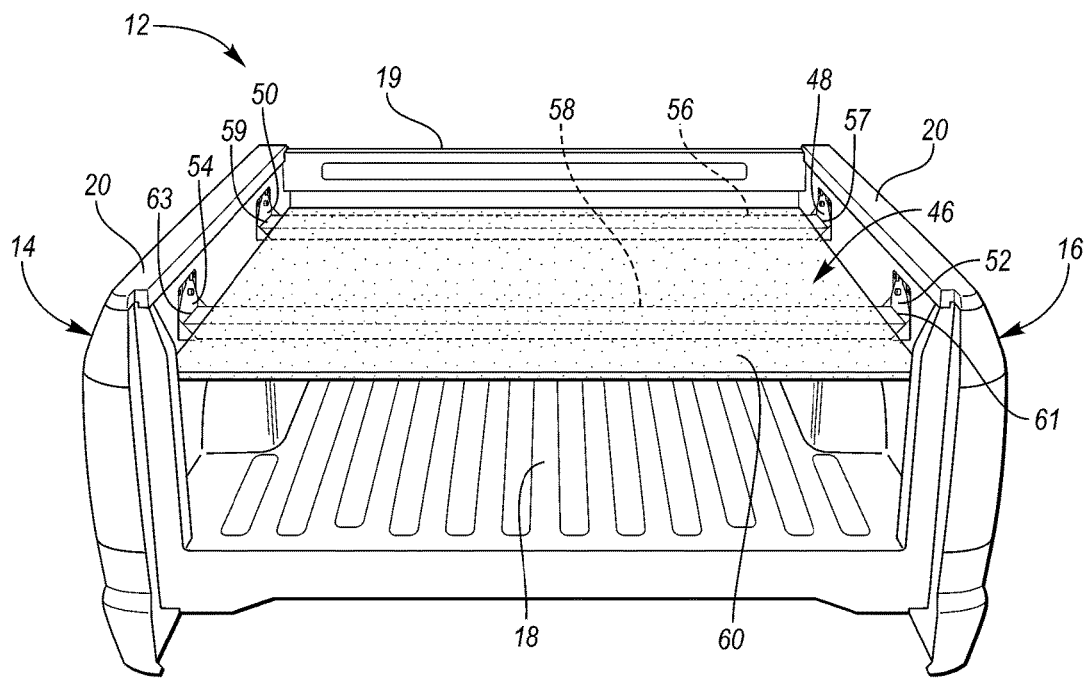
FIG. 3 is a rear perspective view of the truck bed having a second tier loading system secured thereto.

Referring to FIG. 3, the truck bed 12 is illustrated. A second tier loading system 46 is secured to the truck bed. The truck bed 12 and second tier loading system 46 combination may be referred to as a truck bed cargo transport system. The second tier loading system 46 includes a first bracket 48 and a second bracket 50 that are secured to a first set of fixed plates 30. One of the first set of fixed plates 30 is secured to the internal side surface 26 of the first side panel 14 while the other of the first set of fixed plates 30 is secured to the internal side surface 26 of the second side panel 16. Each of the first set of fixed plates 30 may be located at approximately the same distance from the headboard panel 19 and at approximately the same height above the truck bed floor panel 18. The second tier loading system 46 also includes a third bracket 52 and a fourth bracket 54 that are secured to a second set of fixed plates 30. One of the second set of fixed plates 30 is secured to the internal side surface 26 of the first side panel 14 while the other of the second set of fixed plates 30 is secured to the internal side surface 26 of the second side panel 16. Each of the second set of fixed plates 30 may be located at approximately the same distance from the headboard panel 19 and at approximately the same height above the truck bed floor panel 18. The first set of fixed plates 30 and second set of fixed plates 30 may be located at different distances from the headboard panel 19. However, each fixed plate 30 that comprises the first and second sets of fixed plates 30 may be located at approximately the same height above the truck bed floor panel 18. Each bracket (i.e., first bracket 48, second bracket 50, third bracket 52, and fourth bracket 54) may have upright members that are secured to their respective fixed plates 30 and horizontal members that extend from the upright members and inward relative to the truck bed 12.

The second tier loading system 46 includes a first crossbeam 56 disposed on the tops of the horizontal members of the first bracket 48 and second bracket 50. More specifically, a first end 57 of the first crossbeam 56 may be disposed on the top of the horizontal member of the first bracket 48 while a second end 59 of the first crossbeam 56 may be disposed on the top of the horizontal member of the second bracket 50. The first crossbeam 56 may span the first side panel 14 and second side panel 16. The first crossbeam 56 may be located between the top surfaces 20 of the first and second side panel 14, 16 and the truck bed floor 18. The second tier loading system 46 also includes a second crossbeam 58 disposed on the tops of the horizontal members of the third bracket 52 and fourth bracket 54. More specifically, a first end 61 of the second crossbeam 58 may be disposed on the top of the horizontal member of the third bracket 52 while a second end 63 of the second crossbeam 58 may be disposed on the top of the horizontal member of the fourth bracket 54. The second crossbeam 58 may also span the first side panel 14 and second side panel 16. The second crossbeam 58 may also be located between the top surfaces 20 of the first and second side panel 14, 16 and the truck bed floor 18. The first crossbeam 56 and second crossbeam 58 may be disposed on the tops of the horizontal members of their respective brackets such that the first crossbeam 56 and second crossbeam 58 are located at approximately the same height above the truck bed floor panel 18.

A load platform 60 may be disposed on the tops of both the first crossbeam 56 and second crossbeam 58. The load platform 60 provides support for a second level of cargo, that is positioned above a first level cargo located on the truck bed floor panel 18. The load platform 60 may transfer the load of the cargo disposed thereon to the first side panel 14 and second side panel 16 via the crossbeams 56, 58 and brackets 48, 50, 52, 54. The second tier loading system 46 may include additional brackets secured to additional fixed plates and additional crossbeams to provide increase support for the load platform 60. The brackets may alternatively be referred to as a plurality of brackets and the crossbeams may alternatively be referred to as a plurality of crossbeams.

Figure 4:
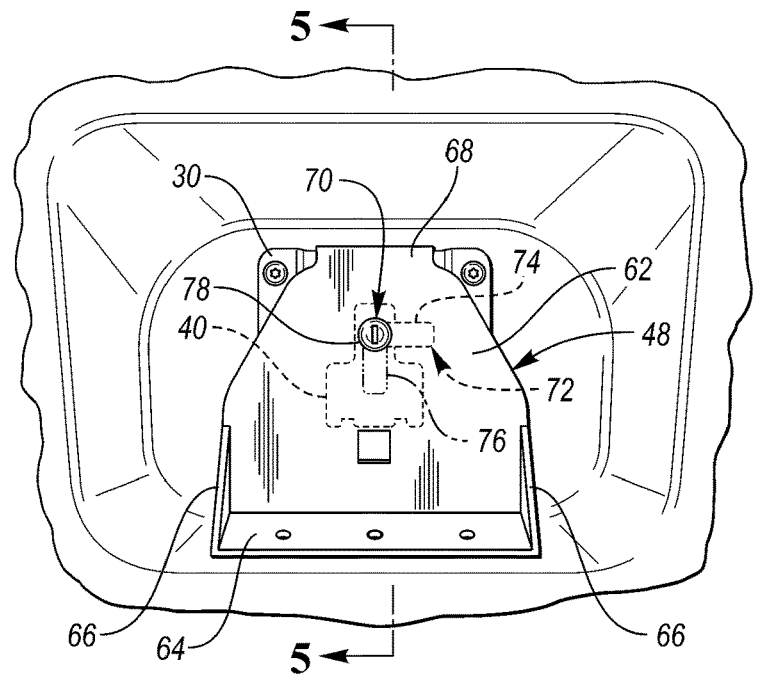
FIG. 4 is a perspective front view of one of a plurality of a brackets utilized to secure a load platform of the second tier loading system of the to the truck bed.
Figure 5:
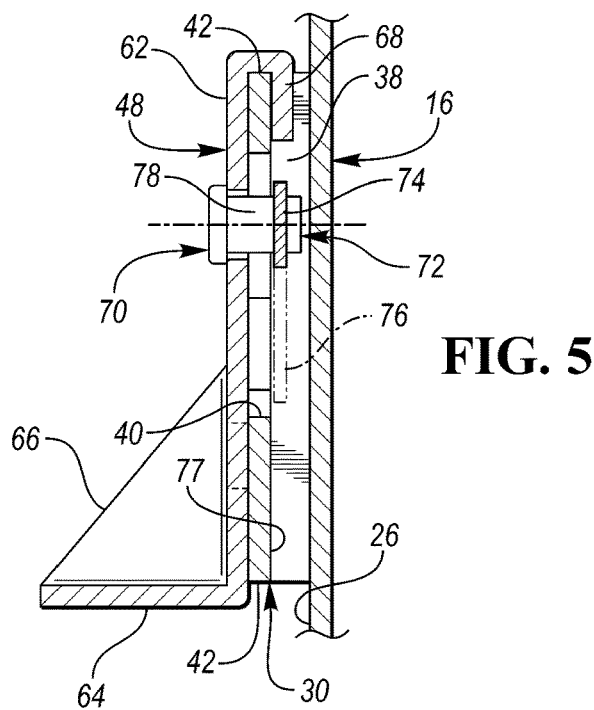
FIG. 5 is a cross-sectional view taken along line 5-5 in FIG. 4.

Referring to FIGS. 4 and 5, the first bracket 48 of the second tier loading system 46 is illustrated. It should be understood that, although FIGS. 4 and 5 depict the first bracket 48, FIGS. 4 and 5 may be representative of any of the brackets of the second tier loading system 46. The first bracket 48 includes an upright member 62 secured to a respective fixed plate 30. The first bracket 48 also includes the horizontal member 64 that extends from the upright member 62, away from the fixed plate 30, and inward relative to the truck bed 12 (i.e., the horizontal member 64 extends away from internal side surfaces 26 and into the truck bed 12). The first bracket 48 may be an L-shaped bracket. Alternatively, the upright member 62 may be referred to as the substantially vertical leg. Alternatively, the horizontal member 64 may be referred to as the substantially horizontal leg. Substantially vertical may refer to exactly vertical plus or minus any incremental value up to 10°. Substantially horizontal may refer to exactly horizontal plus or minus any incremental value up to 10°. All of the other brackets (i.e., second bracket 50, third bracket 52, and fourth bracket 54) would also include upright members secured to a respective fixed plate and horizontal members, where the horizontal members extend from their respective upright member, away from the respective fixed plate 30 the bracket is secured to, and inward relative to the truck bed 12, regardless if the brackets are attached to fixed plates that secured to the first side panel 14 or second side panel 16 of the truck bed 12.

The first bracket 48 and all the other brackets (i.e., second bracket 50, third bracket 52, and fourth bracket 54) may include gussets 66 disposed along the ends of the horizontal member 64 that extend from the horizontal member 64 to the upright member 62. The gussets 66 may be configured to trap (or prevent side to side movement of) a respective end of a crossbeam (e.g., ends of the first crossbeam 56 or second crossbeam 58) that is disposed on the top of the horizontal member 64.

The first bracket 48 may include a hanger 68 that extends over the upper edge 42 of the fixed plate 30 and downward into the gap 38 defined by the offset section 36 of the fixed plate 30 in order to secure the first bracket 48 to the fixed plate 30. The other brackets (i.e., second bracket 50, third bracket 52, and fourth bracket 54) may also include a hanger 68 to secure the specific bracket to a respective fixed plate 30.

The first bracket 48 may also include a locking mechanism 70 that extends through the hole (or keyway) 40 and into the gap 38 defined by the offset section 36 of the fixed plate 30. Locking mechanism 70 may include a latch 72 that is configured to transition between a locked position 74 and an unlocked position 76. The latch 72 may engage a rear surface 77 of the offset section 36 of the fixed plate 30 within the gap 38 in order to secure the first bracket 48 to the fixed plate 30. The locking mechanism 70 may also include a tumbler 78 that includes a keyhole that is configured to receive a key in order to lock or unlock the first bracket 48 to the fixed plate 30. The other brackets (i.e., second bracket 50, third bracket 52, and fourth bracket 54) may also include a locking mechanism 70 to secure the specific bracket to a respective fixed plate 30.

Figure 6:
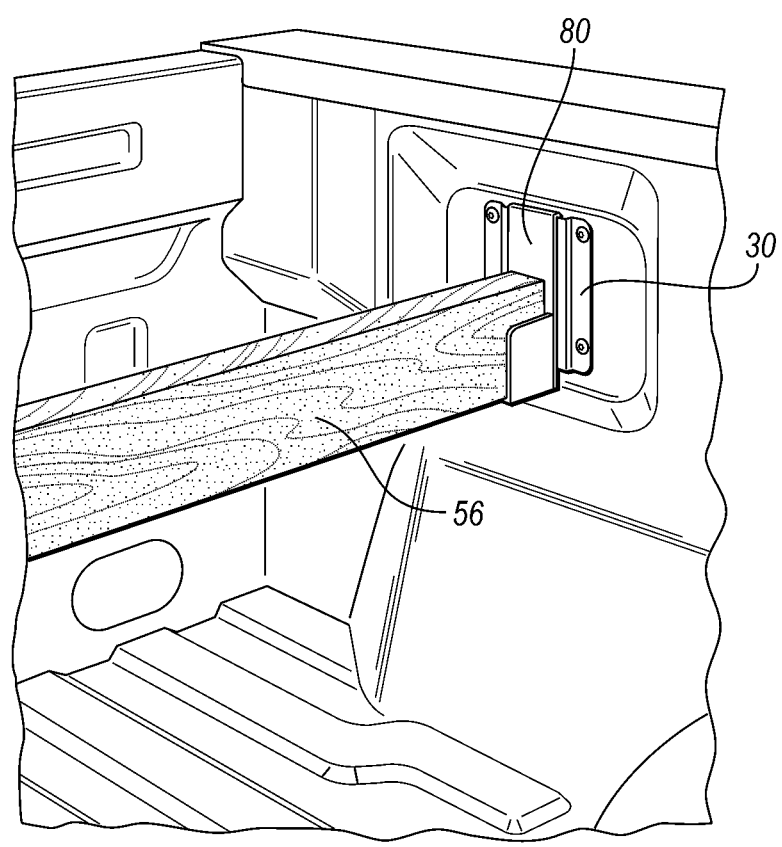
FIG. 6 is a perspective view of an alternative embodiment of the brackets utilized to secure the load platform to the truck bed.

Referring to FIG. 6, an alternative embodiment of a bracket 80 is illustrated. The alternative embodiment of the bracket 80 may be substituted for the brackets depicted in FIGS. 3-5 (i.e., first bracket 48, second bracket 50, third bracket 52, and fourth bracket 54). The alternative embodiment of the bracket 80 should be construed to have all of the attributes of the first bracket 48, second bracket 50, third bracket 52, and fourth bracket 54, unless otherwise described herein. The distance between the ends of the horizontal member of the bracket 80 and the gussets disposed along the ends of the horizontal member (that extend from the horizontal member to the upright member) is smaller in the alternative embodiment of the bracket 80 when compared to the first bracket 48, second bracket 50, third bracket 52, and fourth bracket 54. The shorter distance allows for the ends of crossbeams (i.e., first crossbeam 56 or second crossbeam 58) to be placed within the bracket in a vertical manner, as opposed to a horizontal manner, which provides additional strength. For example, if the first crossbeam 56 was a 2×4 piece of wood (having a two-inch height and a four-inch width), the first bracket 48, second bracket 50, third bracket 52, and fourth bracket 54 would orient the two-inch height in a vertical manner and the four-inch width in a horizontal manner, while the alternative embodiment of the bracket 80 would orient the four-inch width in a vertical manner and the two-inch height in a horizontal manner.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
a truck bed having first and second side panels extending upward from a floor panel;
first and second docking plates secured to opposing internal surfaces of the first and second side panels, respectively, and having protruding middle sections that define gaps between the first and second docking plates and the internal surfaces of the first and second side panels, respectively, wherein the protruding middle sections define keyways that access the gaps; and
first and second brackets having upright members secured to the first and second docking plates, respectively, horizontal members extending from the upright members inward relative to the truck bed, and locking mechanisms that extend through the keyways into the gaps, the locking mechanisms including latches that engage the first and second docking plates within the gaps to secure the first and second brackets to the first and second docking plates, respectively.

2. The vehicle of claim 1 further comprising a first crossbeam disposed on tops of the horizontal members of the first and second brackets, the crossbeam spanning the first and second side panels in-between the floor panel and tops of the first and second side panels.

3. The vehicle of claim 2 further comprising:
third and fourth docking plates secured to the opposing internal surfaces of the first and second side panels, respectively; and
third and fourth brackets having upright members secured to the third and fourth docking plates, respectively, and horizontal members extending from the upright members of the third and fourth brackets inward relative to the truck bed.

4. The vehicle of claim 3 further comprising a second crossbeam disposed on tops of the horizontal members of the third and fourth brackets, the second crossbeam spanning the first and second side panels in-between the floor panel and the tops of the first and second side panels.

5. The vehicle of claim 4 further comprising a load platform disposed on tops of the first and second crossbeams.

6. The vehicle of claim 1, wherein the first and second brackets have hangers that extend downward into the gaps to secure the first and second brackets to the first and second docking plates, respectively.

7. The vehicle of claim 1, wherein the locking mechanisms include tumblers and the latches are secured to the tumblers.

8. The vehicle of claim 1, wherein the first and second brackets have gussets extending between the upright members and the horizontal members.

9. A truck comprising:
a cargo bed having a side panel extending upward from a floor panel;
a docking plate secured to an internal surface of the side panel between a top of the side panel and the floor panel, and having a protruding middle section that defines a gap between the docking plate and the internal surface of the side panel, the protruding middle section defining a keyway that accesses the gap; and
an L-shaped bracket having a substantially vertical leg secured the docking plate, a substantially horizontal leg extending from the vertical leg inward relative to the cargo bed, and a locking mechanism that extends through the keyway into the gap, the locking mechanism including a latch that engages the docking plate within the gap to secure the L-shaped bracket to the docking plate.

10. The truck of claim 9, wherein L-shaped bracket has a hanger that extends downward into the gap to secure the L-shaped bracket to the docking plate.

11. The truck of claim 9, wherein the locking mechanism includes a tumbler and the latch is secured to the tumbler.

12. The truck of claim 9, wherein the L-shaped bracket has a gusset extending between the vertical leg and the horizontal leg.

13. A truck bed comprising:
   a side panel having an internal surface;
   a docking plate secured to the internal surface, having a protruding middle section defining a keyway, and defining a gap between the middle section and internal surface;
   a bracket having upright and horizontal members; and
   a latch extending from the upright member, through the keyway, and into the gap, and engaging the docking plate within the gap, securing the bracket to the docking plate.

14. The truck bed of claim 13 further comprising a tumbler, and wherein the latch is secured to the tumbler.

* * * * *